United States Patent

[11] 3,546,374

| [72] | Inventor | Michael Graser, Jr.<br>Bedford, Massachusetts |
|---|---|---|
| [21] | Appl. No. | 694,174 |
| [22] | Filed | Dec. 28, 1967 |
| [45] | Patented | Dec. 8, 1970 |
| [73] | Assignee | Technical Operations, Incorporated<br>Burlington, Massachusetts<br>a corporation of Delaware |

[54] IMAGE PROCESSING SYSTEM AND METHOD
13 Claims, 11 Drawing Figs.

[52] U.S. Cl. .................................................. 178/5.4;
350/162, 350/171; 353/31; 355/71
[51] Int. Cl. ...................................................... G02b 27/38;
H04n 9/08
[50] Field of Search ............................................. 350/162,
162(SF); 178/5.4(C.R), 5.4(4 TCC)

[56] References Cited
UNITED STATES PATENTS

| 3,195,396 | 7/1965 | Horwitz et al. | 350/162(SF)UX |
| 3,196,205 | 7/1965 | Bedford | 178/5.4(4TCC) |
| 3,314,052 | 4/1967 | Lohmann | 350/162X |
| 3,421,809 | 1/1969 | Lohmann | 350/162 |
| 3,425,770 | 2/1969 | Mueller et al. | 350/162 |
| 3,437,824 | 4/1969 | Lohmann | 350/162X |

Primary Examiner—John K. Corbin
Attorneys—Alfred H. Rosen and John H. Coult

ABSTRACT: This disclosure depicts methods and apparatus for retrieving and processing photostored information which involves forming a diffraction pattern of a record, generating a plurality of conjugate images of the diffraction pattern, providing a filtering operation on at least one of the diffraction pattern images thus formed, and retransforming the diffraction pattern to produce one or more record reconstruction images. More particularly, this disclosure depicts particular methods and apparatus applying such concepts in color television film reproduction and in image contrast enhancement.

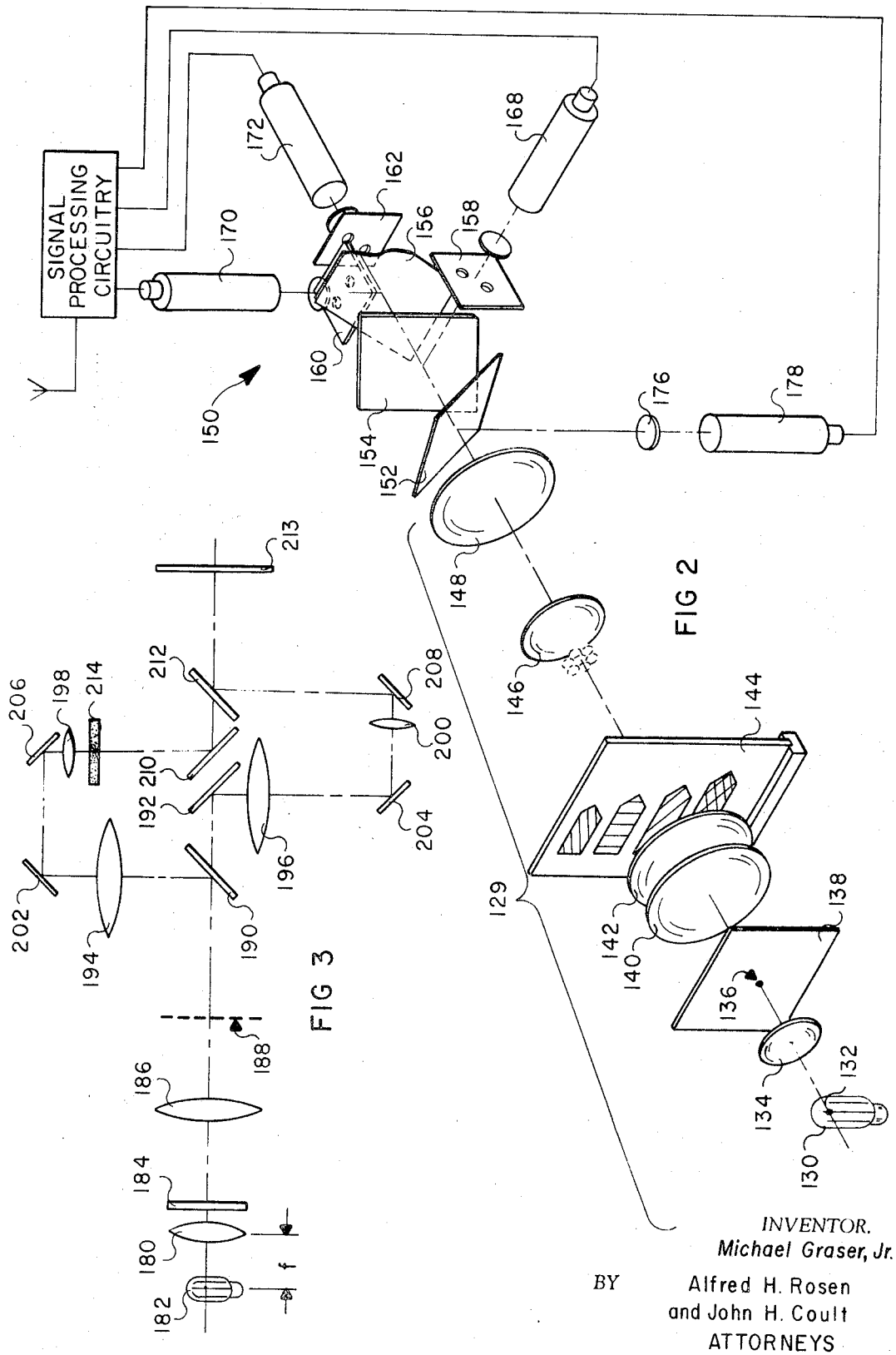

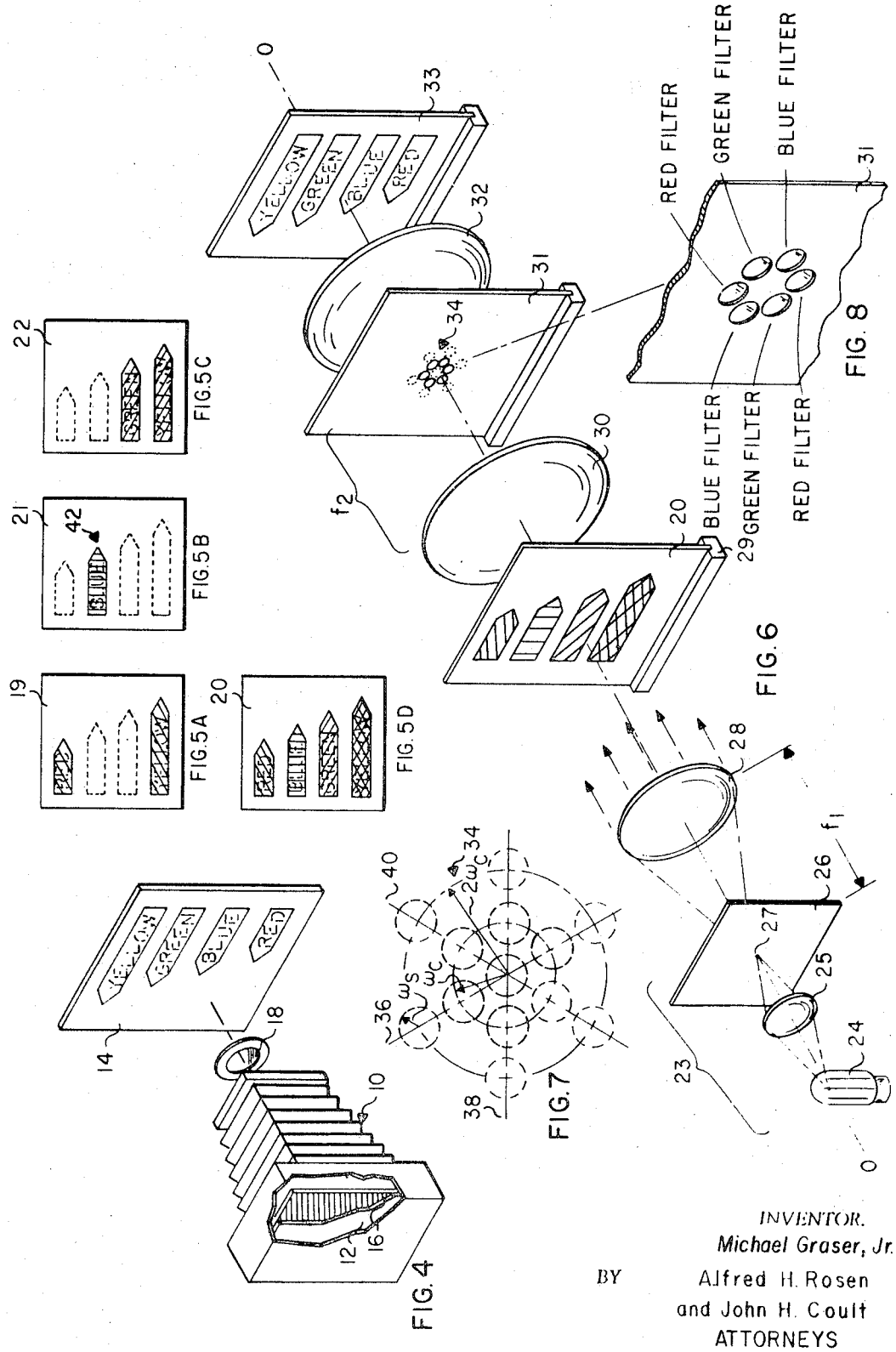

IMAGE PROCESSING SYSTEM AND METHOD

CROSS-REFERENCES TO RELATED APPLICATIONS

The subject matter described herein concerns inventions described and claimed in the following copending, commonly assigned, U.S. Pat. applications: of Frederick C. Henriques, et al. U.S. Pat. Ser. No. 691,567, filed Dec. 18, 1967, of Edmund L. Bouche, et al., U.S. Pat. Ser. No. 697,267, filed Dec. 18, 1967.

OBJECTS OF THE INVENTION

It is an object of this invention to provide image-processing and detecting methods and apparatus-employing spatial filtering techniques to enhance the recovery of photostored information.

It is another object to provide methods and apparatus for retrieving from a photostorage record a plurality of images capable of being separately processed, for example by spectral filtering, and subsequently recombined to form a composite reconstruction image of the record manifesting an alteration of at least one record characteristic.

It is an object of this invention to provide methods and apparatus for retrieving in a plurality of optical channels distinct image information from a record comprising a plurality of superimposed images respectively multiplied with a unique spatially periodic modulation, for performing different filtering separations in different ones of said channels, and for photodetecting the information in each channel at a distinct detection plane.

It is an object of this invention to provide, in the field of color television film reproduction, methods and systems for interfacing a coherent-type projection system input with a substantially conventional television camera chain, which methods and systems require no spectral filtering of the optical input. It is thus an object to provide a television camera chain with improved efficiency.

It is still another object to provide a color television film reproduction system which is compatible for either a coherent projection system input or a conventional incoherent system input.

Further objects and advantages of the invention will be obvious and will in part become apparent as the following description proceeds. The features of novelty which characterize the invention will be pointed out with particularity in the claims annexed to and forming a part of this specification.

SUMMARY OF THE INVENTION

This invention concerns image-processing methods and apparatus which involves illuminating a photostorage record to be displayed; forming in a Fourier transform space a Fourier transform of the luminance distribution at the record; forming a plurality of conjugate images of the transform space; filtering at least one of the transform space images; and retransforming the transform space images to form at least one record reconstruction image.

BRIEF DESCRIPTION OF THE DRAWINGS

For a full understanding of the invention, reference may be had to the following detailed description taken in connection with the accompanying drawings herein.

FIG. 2 is an alternative embodiment of a color television film reproduction system which may be constructed in accordance with the invention;

FIG. 3 illustrates yet another embodiment of the inventive concepts useful in the formation of images from a photostorage record which have enhanced contrast;

FIG. 4 is a distorted-scale schematic perspective view of a colored object and camera which might be used forming photographic records of the object in accordance with prior art techniques of spectral zonal photography; the view shows the camera partially broken away to reveal a photographic recording material and a diffraction grating which would be otherwise hidden within the interior of the camera;

FIGS. 5A—5D show individual and composite color separation records of the object being photographed, each of the individual records being associated with a particular zone of the visible spectrum and with a periodic modulation distinctive by its relative azimuthal orientation;

FIG. 6 is a distorted-scale schematic perspective view of a prior art projection display apparatus for displaying photographic records of the above-described type;

FIG. 7 is a front elevation view, schematic and grossly simplified for ease of understanding, of a Fraunhofer diffraction pattern which might be formed in a Fourier transform space in the apparatus of FIG. 5; and FIG. 8 is a schematic perspective view, enlarged and partially broken away, of a spatial and spectral filter shown in FIG. 5.

DESCRIPTION OF THE PREFERRED EMBODIMENTS

Figure 1:
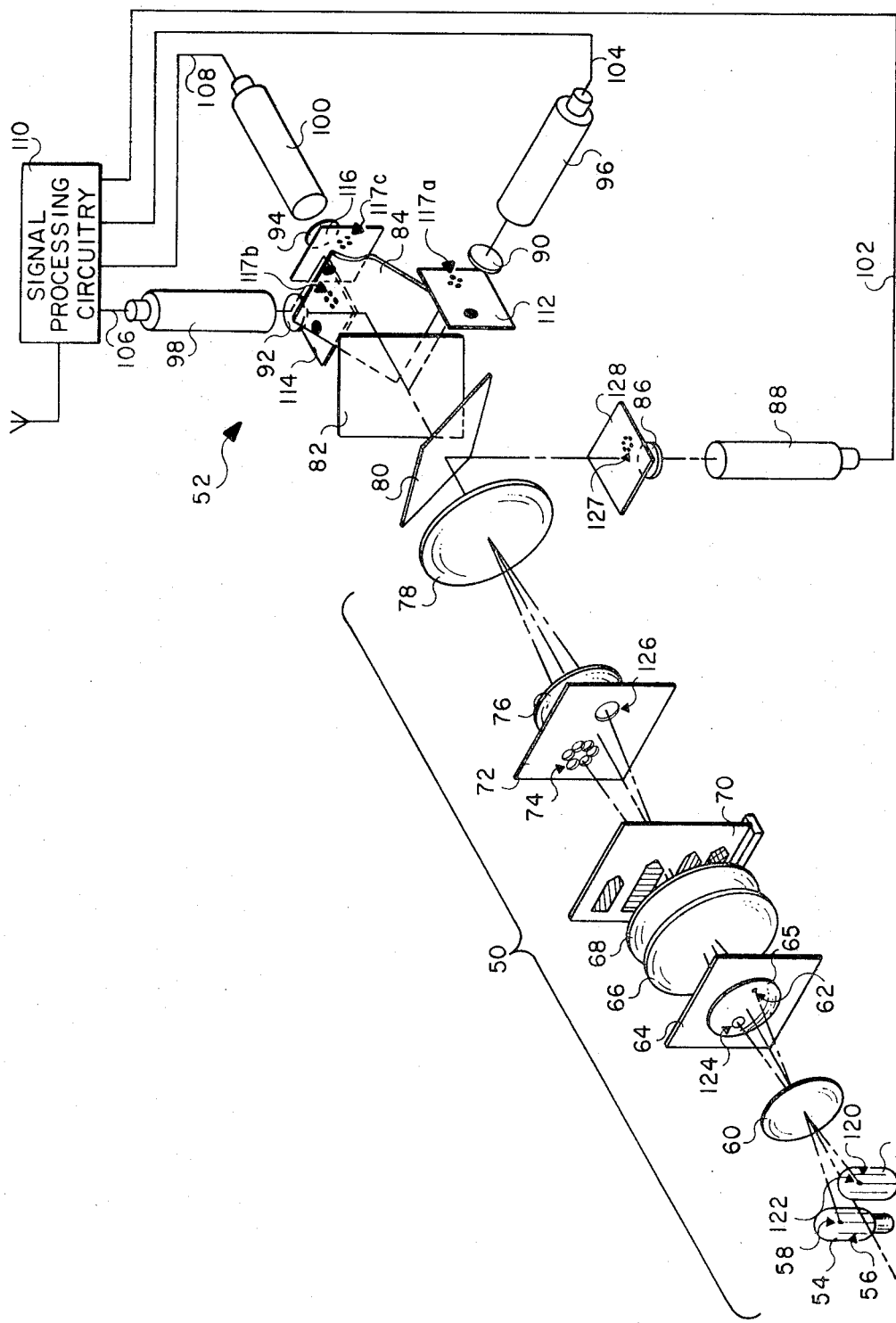
FIG. 1 is a schematic distorted-scale perspective view of a color television film reproduction system which may be constructed in accordance with the teachings of the invention.

Three of the many possible implementations of the inventive principles are shown in FIGS. 1—3. FIGS. 1 and 2 show the interfacing of a coherent optical projection system with a parallel monochrome-type studio television camera chain in accordance with the invention.

FIG. 3 shows an alternative embodiment of the invention useful in enhancing the contrast of photostored images. Before a full understanding of the invention may be achieved, it is important that the reader have a general familiarity with the spectral zonal photographic and display concepts involved. Thus, before undertaking a detailed explanation of the invention and its contemplated modifications and implementations, a general discussion of the involved spectral zonal photography and display concepts will first be undertaken. In connection therewith, reference may be had to FIGS. 4—8.

FIG. 4 shows in very schematic form a photographic camera 10 which might be employed to form a spectral zonal spatially periodically modulated photographic record of the type utilized in the present invention. The record may be formed as a composite of three separate color separation exposures of a photosensitive film 12 in the camera 10. The separate color separation records thus formed are respectively associated with a spatial periodic modulation, imposed, for example, by a diffraction grating 16 adjacent the film 12, which is unique in terms of its relative azimuthal orientation.

FIG. 4 depicts the first step of a multistep operation for forming such a composite record. An object 14, illustrated as having areas of predominantly yellow, green, blue, and red spectral reflectance characteristics, as labeled, is photographed through a filter 18 having a spectral transmittance peak in the red region of the visible spectrum. A grating 16 having a line orientation sloping, for example, at 30° to the horizontal, from upper right to lower left (as the grating would appear if viewed from the back of the camera), is juxtaposed with the film 12 to effect a superposition of a shadow image of the grating 16 on the red light image of object 14. The resulting color separation record 19 associated with the red content in the object 14, processed to a positive, for example by reversal processing techniques, would appear as shown in FIG. 5A. The object appears inverted, of course, because of the property of the objective lens of rotating the image 180°. It is seen from FIG. 5A that the grating modulation is superimposed upon the object detail associated with light having a red spectral content. Note that because of the red constituent of yellow light, the yellow area in the object 14 is also imaged with superimposed grating lines of like angular orientation.

To complete the formation of a composite photographic record, as shown in FIG. 5D at 20, color separation exposures are then made successively through a filter having a spectral transmittance characterized by a blue dominant wavelength with a diffraction grating oriented vertically, and then finally through a filter having a spectral transmittance dominant in the green region of the spectrum with a diffraction grating having a grating orientation sloping from the upper left to lower right, for example, at 30° to the horizontal.

It is seen from FIG. 5B that the blue color separation record 21 does not result in the exposure of any part of the film 12 not associated with blue content in the object 14; however, on exposure to the object 14 through a green filter, the yellow area is again exposed with grating image superimposed thereon with an orientation associated with the green color separation record 22. Thus, as shown in FIG. 5D, the object area having yellow spectral content has superimposed thereon spatial periodic modulations associated with both the red and green color separation records.

Apparatus for displaying such a photographic record is known to the prior art and may take the form shown in FIG. 6. Such display apparatus includes a source 23 of partially coherent light, illustrated as comprising an arc lamp 24, a condenser lens 25, and a mask 26 having an aperture 27 of restricted diameter. A lens 28 is provided for effectively transporting the point light source formed to a far field, which may be either real or virtual, as desired. A film gate 29 for supporting a transparency record to be displayed, a transform lens 30 (explained below), a Fourier transform filter 31 (explained below), a projection lens 32, and a display screen 33 complete the display apparatus.

Upon illumination of a transparency record, such as composite record 20, in film holder 29, as a result of diffraction and interference phenomena and the relative angular displacement between the periodic modulations respectively associated with the color separation records 19, 21, and 22, three angularly displaced multiorder diffraction patterns, collectively designated by reference numeral 34, will be produced. Each of the separate diffraction patterns associated with a separate color separation record contains a zeroth order which is spatially coextensive with the zeroth order (undiffracted) components of each of the other patterns, and a plurality of higher order (diffracted) components each containing the related color object spatial frequency spectrum modulating a carrier having a frequency equal to a multiple of the grating fundamental frequency, the value of the multiple being a function of the diffraction order $m$.

By the use of transform lens 30 these diffraction patterns are formed within the confines of the projection system in a space commonly known as the Fourier transform space. It is thus termed because of the spatial and temporal frequency analysis which is achieved in this plane by the described diffraction and interference effects. Through the use of spatial and spectral filtering of these patterns in the transform plane, one or more of the discrete records may be displayed, for example, to achieve a reconstitution of the original scene in true color or in a color of a selected spectral composition.

The nature of the Fourier transform space and the effects that may be achieved by spatial filtering alone or by spatial and spectral filtering in this space of a selected diffraction order or orders may be understood by reference to FIG. 7 showing an enlarged frontal view of hypothetical diffraction patterns which might be formed in the transform space of the projection system described above. FIG. 7 shows three angularly separated diffraction patterns corresponding to the red, green, and blue light object spatial frequency spectra lying along axes labeled 36, 38, and 40, respectively. Each of the axes 36, 38, and 40 is oriented orthogonally to the periodic modulation on the associated color separation record. The diffraction patterns share a common zeroth order location but have spatially separated higher orders.

By the nature of diffraction phenomena, the diffraction angle $\alpha$ is:

$$\alpha = \lambda \omega$$

where $\lambda$ represents the spectral wavelength of the illumination radiation and $\omega$ represents spatial frequencies. Assuming the light at the film gate 29 to be collimated, the diffraction orders will be formed in the transform space at the delta function positions determined by the transform of the record modulation at radial distances from the pattern axis:

$$R = f_2 m \omega_c \bar{\lambda}$$

where $f_2$ is the focal length of lens 30; $\bar{\lambda}$ is the mean wavelength of the illuminating radiation; $m$ represents the diffraction order; and $\omega_c$ is the fundamental grating frequency.

The first orders of each of the diffraction patterns can be considered as being an object spatial frequency spectrum of maximum frequency $\omega_S$ (representing a radius of the order) convolved with a carrier of spatial frequency $\omega_c$. The second order components can be thought of as being the convolution of an object spectrum having a maximum spatial frequency $\omega_S$ with a carrier having a spatial frequency of $2\omega_c$, and so forth. Thus, the various orders of each diffraction pattern may be thought of as being harmonically related, with a spatial frequency $\omega_c$, or an even multiple thereof, acting as a carrier for the spectrum of spatial frequencies characterizing the object detail. Two orders only are shown; however, it should be understood that even higher orders are present, but will be of increasingly less intensity.

Spatial filtering of the diffraction pattern is achieved by placing the apertured transform filter 31 in the transform space, as shown in FIG. 5. Since the zeroth order components of the diffraction patterns are spatially coextensive, the spatial frequencies contained in the zeroth order information channel represents the sum of the object spectra respectively associated with each of the color separation records, 19, 21, and 22. Thus an opening in the transform filter 31 at the zeroth order location would result in a composite image of object 14 being formed in tones of grey, black, and white. Because the information channels associated with each of the color separation records are inseparably commingled in the zeroth order, they cannot be properly recolored to effect a faithful color reproduction of the photographed object. However, at the higher orders, because of the angular displacement of the red, blue, and green-associated axes 36, 38, and 40, the proper spectral characteristic may be added to each of the information channels by appropriate spectral filtering.

FIG. 8 represents an enlargement of a central portion of filter 31, illustrating appropriate spatial filtering apertures with the correct spectral filters to effect a true color reproduction of the object. It should be understood, of course, that higher order components, appropriately spectrally filtered, could also be passed, if desired. However, to maintain the discussion at a fundamental level, utilization of only the first order diffraction components has been illustrated.

Consider now a trace of the projection illumination as it traverses the projection system. The lamp 24 and condenser lens 25 are designed to evenly illuminate aperture 27 in mask 26 with a beam of maximum intensity broadband luminous energy. Lens 28 is shown spaced axially from mask 26 a distance substantially equal to its focal length in order that the light illuminating the film gate is substantially collimated. Transform lens 30 collects the substantially planar wave fronts in the zeroth order and diffracted higher orders and brings them to a focus in transform space in the aperture of the projection lens 32. The lenses 28 and 30 may be thus thought of as cooperating to image the illuminated aperture 27 in mask 26 on the transform filter 31.

It is evident that the display of photographic records of the above-described type is hampered by the low levels of image brightness which may be obtained. An important constraint on the image brightness results from a requirement that the effective source must not exceed a predetermined maximum size to prevent overlap, and thus "cross talk" between the diffraction orders. It is seen that the center of each of the higher orders of a diffraction pattern is spaced radially from the pattern axis by an integral multiple of the carrier frequency $\omega_c$ and that the radius of each of the orders corresponds to spatial frequency $\omega_s$. To prevent overlap between the zeroth and higher orders, $\omega_c$ must be greater than, or at least equal to $2\omega_s$. (This may be thought of as a version of the sampling theorem.) Since each diffraction order is an image of the illuminated aperture 27 in mask 26 magnified by the ratio $f_2/f_1$, it follows then that the diameter $d$ of the aperture 27 in mask 26, and thus the total light flux transmissible through the aperture 27, is constrained in accordance with the relationship (assuming collimated light at the film gate 29);

$$d = f_1 \bar{\lambda} \omega_c$$

where $f_1$ represents the focal length of lens 28, and $\bar{\lambda}$ and $\omega_c$ are as indicated above.

The illuminance of the film gate by the collimator is $$E = \frac{Bd^2}{4f_1^2} \pi$$

where B is the source photometric brightness (luminance) in candles/cm². Substituting for $d$ from above $$E = \frac{\pi B \bar{\lambda}^2 \omega_c^2}{4}$$

This relation clearly illustrates that an increase in the brightness of displayed images can be obtained only at the cost of increasing the source brightness B or the grating frequency $\omega_c$.

With an understanding of the nature of the involved spectral zonal photography and display utilizing spatial carriers and spatial filtering techniques, reference is now made to FIG. 1 showing a preferred embodiment of the inventive concepts. FIG. 1 depicts a color television film reproduction system comprising an input section, designated generically by reference numeral 50, and a parallel monochrome-type color television camera chain, designated generically by reference numeral 52.

The input section of the system is effective to provide four optical information channels, three of the channels containing the red, blue, and green color information in the original scene, as recorded, and a luminance or monochrome channel which carries information characterizing the same luminance distribution.

The three color channels are established with a light source which creates a beam having at least partial coherence at the film gate, the three color channels being spatially separated in a Fourier transform space by diffraction and interference phenomena substantially as described above with respect to the FIG. 6 display system. The luminance channel is established by a second light source generating a light beam which is substantially incoherent at the film gate and which is angularly displaced with respect to the coherent illumination beam so as to not interfere therewith.

Referring now to FIG. 1, in order to establish the said coherent illumination beam, there is preferably provided a projection lamp 54 having a pair of electrodes 56 establishing an arc 58 therebetween of intense luminosity. A condensing lens 60 collects light from the lamp 54 and brings the collected radiation to a focus at an opening 62 of restricted size in a mask 64. A field lens 65 minimizes light losses. An effective point source illumination is thus created. A collimating lens disposed a distance $f_1$ equal to its focal length away from the mask 64 produces a substantially collimated beam of radiation. A transform lens 68 focuses the collimated beam through the film gate at which is located a record 70. The back focal plane of lens 68 is known as the Fourier transform plane in which appears a diffraction pattern of the record spatial frequencies.

Assume the record 70 to be substantially identical to the record 20 in the FIG. 6 system. In the Fourier transform space the spatial frequency spectra characterizing the red, blue, and green scene content, stored on the record 70 as described above, will appear in component diffraction patterns lying along angularly spaced diffraction axes, each of the component diffraction patterns comprising a convolution of the spectra of the particular color separation with a Dirac delta function. Thus the red, blue, and green color information in the scene is caused to be spatially separated in the transform space. A spatial filter comprising a mask 72 having a hexagonal array of spatial filter openings 74 therein will pass the first-order components of the diffraction patterns associated with each of the color separation stored on the record 70. A projection lens 76 retransforms the diffraction patterns, forming a composite reconstruction image of the record 70 at a field lens 78 located at the input to the television camera chain 52. Because no temporal spectral filtering was performed in the said transform space, the composite reconstruction is, of course, a colorless luminance distribution only.

The illustrated television camera chain 52 is conventional, except for certain novel modifications pointed out below, comprising a beam-splitting mirror 80 which amplitude-divides the input beam, a first dichroic mirror 82 which selectively reflects radiation in the long wavelength (red) portion of visible spectrum and a second dichroic mirror 84 which selectively reflects radiation in the high energy (blue) portion of the spectrum, transmitting the middle-wavelength (green) energy. An objective lens 86 in the reflected light path from the beam-splitting mirror 80 conventionally images a colored reconstruction at the field lens 78 upon the screen of a (preferably high resolution) vidicon tube 88. Similarly, objective lenses 90, 92, and 94 conventionally form respective color separation images of the (normally colored) reconstruction at the field lens 78 on the screens of vidicon tubes 96, 98, and 100. Output signals from the monochrome, red, blue, and green vidicons are transmitted through leads 102, 104, 106, and 108, respectively, to signal-processing designated generically by the reference numeral 110. The signal-processing circuitry 110 accomplishes the necessary amplification, matrixing, and other operations necessary for the preparation of a composite signal suitable for delivery to transmitting equipment.

By this invention, spectral filters in the spatial filter openings 74 in mask 72 and also the dichroic mirrors 82 and 84 in the camera chain 52 are rendered unnecessary. This invention recognizes and exploits the fact that the field lens 78 forms an image of the Fourier transform space in the object space of each of the objective lenses 86, 90, 92, and 94. In accordance with this invention, spatial filtering is accomplished at each of the locations of the images of the diffraction pattern formed in the described Fourier transform space to pass to the associated vidicon tube only the optical channel carrying the color information appropriate for that vidicon tube.

Implementing this concept there are provided spatial filters 112, 114, and 116 in the light paths for the red, blue, and green vidicon tubes, respectively. The spatial filters 112, 114, and 116 are transparent and have opaque areas 117a, 117b, and 117C, respectively. Each of the filters 112, 114, and 116 has the opaque areas 117 disposed at the precise locations of the color separation spectra which it is desired to exclude from passage to that particular vidicon tube. Thus, each of the spatial filters 112, 114, and 116 selectively blocks a mutually exclusive combination of the diffraction orders transmitted through the spatial filter mask 72. The vidicon tubes 96, 98, and 100 are thus caused to receive, respectively, the red, blue, and green scene information.

FIG. 1 depicts the camera chain 52 as including the conventional dichroic mirrors 82 and 84; however it is evident from the above discussion that wavelength-sensitive mirrors are totally unnecessary, and that conventional optical beam-splitting elements which divide the beam in amplitude only could be used.

As intimated above, an additional optical channel carrying only the luminance information on the record 70 is preferably provided. The use of an incoherent luminance channel has the advantage that any random noise produced in the color separation images due to perturbation of the wave fronts in the coherent channel by defects in the photostorage medium are overcome. By the provision of a separate channel for carrying the luminance information, this channel may be of substantially greater spatial frequency bandwidth than the color channels which have inherent bandwidth constraints.

To provide this additional luminance channel, a second projection lamp 118 is provided. The lamp 118 has electrodes 120 establishing an arc 122 therebetween which is imaged by condensing lens 60 upon an opening 124 in mask 64 of sufficient diameter to render the radiation delivered therefrom to the record 70 substantially incoherent. An opening 126 in mask 72 of substantially greater diameter than the diameter of the spatial filter openings 74 transmits a wideband spectrum of record spatial frequencies. In the manner described above the field lens 78 also images the diffraction pattern of the record 70 in the wideband channel. Thus, in order to transmit to the monochrome vidicon tube 88 only the luminance information in the wideband channel, unaffected by the coherence noise in the color channels, it is necessary only to block all the color channel spectra with opaque areas 127 on a spatial filter 128 located at the corresponding location of the image of the incoherent diffraction pattern. The spectra associated exclusively with the luminance information is transmitted through the spatial filter 128 unobstructed.

To prevent color desaturation, the luminance channel spectra is excluded from each of the vidicons 96, 98, and 100 by opaque areas appropriately located (as shown in FIG. 1) on the spatial filters 112, 114, and 116.

Because the spatial filters 112, 114, 116, and 128 include only relatively restricted opaque areas for achieving the described spatial filtering the FIG. 1 system is completely compatible with a conventional projection system input, the amount of energy being absorbed by the opaque filter areas 117a, 117b, 117c, and 127 being negligible in comparison with the energy transmitted.

FIG. 2 depicts an alternative embodiment of a color television film reproduction system which is similar in many respects to the FIG. 1 embodiment with the chief exception being that spatial filtering is done exclusively with opaque apertured masks disposed in the camera chain 52 at the locations of the images of the record diffraction pattern.

In the interest of simplicity and clarity of illustration, the FIG. 2 embodiment is illustrated as including a projection system input 129 which provides red, blue, and green color information channels, but not an additional wideband luminance channel. Briefly, the FIG. 2 embodiment comprises a projection lamp 130 generating an arc 132 which is imaged by a condensing lens 134 upon a pin hole aperture 136 in a mask 138 to produce an effective point source of illumination.

A collimating lens 140 and a transform lens 142 direct a radiation beam through a record 144 which is illustrated as being substantially identical to the record 20 in the FIG. 6 system. A plurality of angularly spaced diffraction patterns associated with the red, blue, and green color separation images stored on the record 144 are thus established. A projection lens 146 forms an image of the record 144 at a field lens 148 at the input to a color television camera chain 150. A plurality of beam-splitters 152, 154, and 156, produce, in conjunction with the field lens 148, four images of the diffraction pattern established in the projection system input 129. Spatial filters 158, 160, and 162 each comprise an opaque mask defining a pair of spatial filter apertures. The orientation of the apertures in the spatial filters is mutually exclusive such that each of the spatial filters transmits to the associated one of vidicon tubes 168, 170, and 172, the information associated with a different one of the color separation images stored on the record 144. Thus the FIG. 2 system achieves detection of the separate color separation spectra, as in the FIG. 1 embodiment, but does not have the further advantage of compatibility with conventional input systems due, of course, to the fact that the spatial filters 158, 160, and 162 are substantially opaque and would thus block substantially all of the energy fed into the camera chain by a conventional projection system. The FIG. 2 system could be adapted for use with the conventional system input merely by removing the spatial filters and replacing the beam-splitters 154 and 156 with appropriate dichroic mirrors.

The reconstruction at the field lens 148 is imaged by an objective lens 176 on the screen of a monochrome vidicon tube 178 to provide an image whose luminance distribution is characteristic of the density distribution of the record viewed as a composite of the component color separation images encoded thereon.

Figure 3 depicts yet another embodiment of the inventive concepts useful in producing a reproduction of a record image having a selected characteristic which is altered by spatial filtering techniques. The FIG. 3 system shows a way by which the teachings of the invention may be outlined to produce contrast-enhanced images. In the FIG. 3 system a collimating lens 180 collecting radiation from a projection lamp 182 directs a collimated beam of radiation through a record 184. A projection lens 186 transforms the luminance distribution in the record 184 into a distribution in terms of spatial frequencies in a Fourier transform space indicated in FIG. 3 by reference numeral 188. The projection lens 186 also images the record, in conjunction with a beam-splitting mirror 190 and a totally reflecting mirror 192 upon a pair of field lenses 194 and 196. A pair of objective lenses 198 and 200 in the upper and lower light paths respectively image, with the use of beam-folding mirrors 202, 204, 206, 208, and half-silvered mirrors 210 and 212, the reconstruction at the field lenses 194 and 196 at a common image plane, shown coincident with an element of photosensitive material 213. Again, as discussed above, this invention recognizes that by such an arrangement the field lenses 194 and 196 each form conjugate images of the Fourier transform space which can be spatially filtered in any desired manner to achieve desired effects in the retransformed filtered image or images. The FIG. 3 embodiment shows a high pass spatial filter 214 located at the conjugate image of the transform space in the upper light path. Thus the image reconstructed at the plane of the photosensitive material 213 is a composite image comprising a first image generated in the upper branch whose spectral frequency content is weighted toward the higher frequencies and thus toward the fine detail in the record, and a second image from the lower branch of the system which constitutes merely an accurate unaltered reproduction of the record. As is well known, the addition of two such images will produce a composite image having the effect of enhanced contrast.

The invention is not limited to the particular details of construction of the embodiments depicted, and it is contemplated that various and other modifications will occur to those skilled in the art. For example, other ways of producing a plurality of conjugate images of a first-created transform space are within the purview of this invention. Other changes may be made in the above-described apparatus and method without departing from the true spirit involved, and it is therefore intended that the subject matter of the above discussion may be interpreted as illustrative and not in a limiting sense.

I claim:
1. An optical image-processing method comprising:
illuminating a record to be displayed;
forming in a Fourier transform space a Fourier transform of the luminance distribution at the record;
forming a plurality of images of said Fourier transform;
filtering at least one of said images;
retransforming said transform images;
optically recombining record reconstruction images formed in said retransformation operation to form a composite reconstruction image; and
photodetecting said composite reconstruction image.

2. A method for processing images erected from a spatially periodically modulated scene record, comprising:
illuminating the record with a beam of light having at least partial coherence at the record;
forming in a Fourier transform space a diffraction pattern of the record spatial frequencies which includes a spectrum of record spatial frequencies convolved with a Dirac delta function associated with said periodic modulation;
forming a plurality of conjugate images of said diffraction pattern;
spatially filtering at least one of said diffraction pattern images; and
retransforming said diffraction pattern images after filtering thereof to form respective reconstruction images of said record.

3. A method for processing images erected from a spatially periodically modulated scene record, comprising:

illuminating the record with a beam of light having at least partial coherence at the record;

forming in a Fourier transform space a diffraction pattern of the record spatial frequencies which includes a spectrum of record spatial frequencies convolved with a Dirac delta function associated with said periodic modulation;

forming a plurality of conjugate images of said diffraction pattern;

spatially filtering at least one of said diffraction pattern images;

retransforming said diffraction pattern images after filtering thereof to form respective reconstruction images of said record; and optically combining said reconstruction images to form a single composite image of said record.

4. An image-processing method for use with a scene record having a plural number of angularly spaced spatially periodic modulations thereon, comprising:

illuminating the record with a beam of light having at least partial coherence at the record;

forming in a Fourier transform space a corresponding plural number of angularly spaced diffraction patterns, each comprising a spectrum of record spatial frequencies convolved with a Dirac delta function;

forming a plurality of conjugate images of said diffraction patterns;

performing different filtering operations on selected diffraction pattern images; and retransforming said diffraction pattern images after filtering thereof to form respective reconstruction images of said record.

5. The method defined by claim 4 including combining predetermined record reconstruction images to form a composite reconstruction image of said record.

6. The method as defined in claim 5 wherein said different filtering operations includes selectively transmitting a mutually exclusive combination of orders of said diffraction patterns at each of said images thereof.

7. An image-processing method for use with a scene record having a plural number of angularly spaced periodic modulations thereon, comprising:

illuminating the record with a beam of light having at least partial coherence at the record;

forming in a Fourier transform space a plural number of angularly spaced diffraction patterns each comprising a spectrum of record spatial frequencies convolved with a Dirac delta function associated with one of said periodic modulations;

spatially filtering said transform space to pass selected orders of said diffraction pattern;

forming a plurality of conjugate images of said diffraction pattern;

selectively blocking a mutually exclusive combination of orders at each of said diffraction pattern images; and retransforming said diffraction pattern images after filtering thereof.

8. A method of color television film reproduction for enabling the televising of full color displays from a colorless record encoded with a plurality of superimposed color separation images multiplied, respectively, with a spatially periodic modulation of unique azimuthal orientation, said method comprising:

illuminating the record with a beam of light having at least partial coherence at the record;

forming in a Fourier transform space a corresponding plurality of angularly spaced diffraction patterns respectively associated with said plurality of color separation images, each diffraction pattern comprising a spectrum of spatial frequencies associated with one of said color separation images convolved with a Dirac delta function;

spatially filtering said transform space to pass a selected order of each of said plurality of diffraction patterns;

forming a plurality of discrete conjugate images of said filtered diffraction patterns;

selectively blocking a mutually exclusive combination of transmitted orders of said diffraction patterns at each of said conjugate pattern images to pass at each pattern image location only the spectrum of spatial frequencies associated with a predetermined color separation image;

retransforming said diffraction pattern spectra after filtering thereof and forming respective color separation images upon the screens of cathode ray pickup tubes;

forming respective electrical signals corresponding to the intensity distributions in said color separation images on said screens; and combining said signals to form a composite signal.

9. An optical image-processing method, comprising:

illuminating a record to be displayed with light from a first source;

forming in a Fourier transform space with said first source a first diffraction pattern of the record spatial frequencies;

illuminating the record with light from a second source;

forming in said Fourier transform space with said second source a second diffraction pattern of the record spatial frequencies spaced from said first pattern;

forming at a plurality of locations conjugate images of said first and second diffraction patterns;

spatially filtering at least one of said diffraction pattern images at at least one of said image locations; and retransforming said diffraction pattern images to form respective reconstruction images of said record.

10. A method of color television film reproduction for enabling the televising of full color displays from a colorless record encoded with a plurality of superimposed color separation images multiplied, respectively, with a spatially periodic modulation of unique azimuthal orientation, said method comprising:

illuminating the record with a first beam of light having at least partial coherence at the record;

illuminating the record with a second beam of light which is substantially incoherent at the record;

forming in a Fourier transform space with said first and second light beams first and second diffraction patterns, said first pattern comprising a corresponding plurality of angularly spaced component patterns respectively associated with said plurality of color separation images, each component diffraction pattern comprising a spectrum of spatial frequencies associated with one of said color separation images convolved with a Dirac delta function;

spatially filtering said transform space to pass a selected diffracted order of each of said plurality of component diffraction patterns in said first pattern, and to pass at least a portion of said second pattern associated with said incoherent source beam;

forming a plurality of discrete conjugate images of each of said first and second diffraction patterns;

selectively blocking said second pattern image and a mutually exclusive combination of transmitted diffracted orders of said component diffraction patterns at each of said conjugate images of said first pattern to pass at each first pattern image location only the spectrum of spatial frequencies associated with a predetermined color separation image;

selectively passing said first pattern image at at least one second pattern conjugate image location to pass a spectrum of spatial frequencies representing the sum of the spectra associated with said color separation images on said record;

retransforming said transmitted diffraction pattern spectra after filtering thereof and forming respective color separation images and a monochrome image upon the screens of respective cathode ray pickup tubes;

forming respective electrical signals corresponding to the intensity distributions in said color separation images; and combining said signals to form a composite signal.

11. A color television film reproduction system for enabling the televising of full color displays from a colorless record encoded with a plurality of superimposed color separation images multiplied, respectively, with a spatially periodic modulation of unique azimuthal orientation, said system comprising:

light source means for illuminating the record with a beam of light having at least partial coherence at the record;

lens means for forming in a Fourier transform space a corresponding plurality of angularly spaced diffraction patterns respectively associated with said plurality of color separation images, each diffraction pattern comprising a spectrum of spatial frequencies associated with one of said color separation images convolved with a Dirac delta function;

mask means disposed in said transform space, said mask means defining openings therein located to pass a selected order of each of said plurality of diffraction patterns;

lens means for forming a plurality of discrete conjugate images of said filtered diffraction patterns;

means for selectively blocking a mutually exclusive combination of transmitted orders of said diffraction patterns at each of said conjugate pattern images to pass at each pattern image location only the spectrum of spatial frequencies associated with a predetermined color separation image;

lens means for retransforming said diffraction pattern spectra after filtering thereof and erecting respective color separation images at distinct detection planes;

a cathode ray pickup tube at the location of each of said color separation images for forming respective electrical signals corresponding to the intensity distributions in said color separation images; and electronic matrixing means for combining said signals to form a composite signal.

12. A system of color television film reproduction for enabling the televising of full color displays from a colorless record encoded with a plurality of superimposed color separation images multiplied, respectively, with a spatially periodic modulation of unique azimuthal orientation, said system comprising:

first light source means for illuminating the record with a first beam of light having at least partial coherence at the record;

second light source means for illuminating the record with a second beam of light which is substantially incoherent at the record;

lens means for forming in a Fourier transform space with said first and second light beams first and second diffraction patterns, said first pattern comprising a corresponding plurality of angularly spaced component patterns respectively associated with said plurality of color separation images, each component diffraction pattern comprising a spectrum of spatial frequencies associated with one of said color separation images convolved with a Dirac delta function;

mask means having openings therein for spatially filtering said transform space to pass a selected diffracted order of each of said plurality of component diffraction patterns in said first pattern, and to pass at least a portion of said second pattern associated with said incoherent source beam;

lens means for forming a plurality of discrete conjugate images of each of said first and second diffraction patterns;

spatial filter means for selectively blocking said second pattern image and a mutually exclusive combination of transmitted diffracted orders of said component diffraction patterns at each of said conjugate images of said first pattern to pass at each first pattern image location only the spectrum of spatial frequencies associated with a predetermined color separation image;

spatial filter means for selectively passing said second pattern image at at least one second pattern conjugate image location to pass a spectrum of spatial frequencies representing the sum of the spectra associated with said color separation images on said record;

lens means for retransforming said transmitted diffraction pattern spectra after filtering thereof and erecting respective color separation images and a monochrome image at distinct detection planes;

a cathode ray pickup tube at the location of each of said color separation images for forming respective electrical signals corresponding to the intensity distributions in said color separation and monochrome images; and electronic matrixing means for combining said signals to form a composite signal.

13. In an optical projection system for retrieving color information from a colorless record containing a plurality of superimposed color separation images respectively modulating spatial carriers having distinct azimuthal orientations, the combination comprising:

light source means for providing an effectively far-field source of light which is spatially coherent at the record at the frequency of said carriers;

transform lens means for forming in a Fourier transform space a Fourier transform of the luminance distribution at the record, including color separation spectra respectively convolved with spatially displaced Dirac delta functions associated with said carriers;

relay lens means for forming a plurality of conjugate images of said Fourier transform; and spatial filter means for filtering said color separation spectra at each of said transform space images, said spatial filter means comprising a substantially transparent support at each transform image location having a light absorptive area or areas located to selectively pass different color separation spectra at each transform space image.